United States Patent [19]
Van Den Bergh

[11] Patent Number: 5,813,713
[45] Date of Patent: Sep. 29, 1998

[54] GRID ELEMENT AND AN APPARATUS INCORPORATING THE GRID ELEMENT FOR ASSISTING IN THE STACKING AND DESTACKING OF PRODUCTS FROM A SURFACE

[75] Inventor: John Van Den Bergh, County Kildare, Ireland

[73] Assignee: Autocast Inventions Limited, County Kildare, Ireland

[21] Appl. No.: 746,303

[22] Filed: Nov. 8, 1996

[51] Int. Cl.[6] .............................. B66C 1/02; B25J 15/06
[52] U.S. Cl. ................... 294/65; 294/2; 414/752
[58] Field of Search ................ 294/2, 64.1, 65; 414/627, 737, 752; 271/91, 94, 95, 102; 901/40

[56] References Cited

U.S. PATENT DOCUMENTS

| | | | |
|---|---|---|---|
| 3,406,938 | 10/1968 | Muir, Jr. | 248/363 |
| 3,523,707 | 8/1970 | Roth | 294/65 |
| 4,674,785 | 6/1987 | Riesenberg | 294/65 |
| 4,787,812 | 11/1988 | Gopfert | 294/65 |

FOREIGN PATENT DOCUMENTS

| | | | |
|---|---|---|---|
| 0351571 | 6/1989 | European Pat. Off. | B65G 47/91 |
| 2025500 | 12/1969 | France | B65G 65/00 |
| 2184072 | 5/1973 | France | B65G 47/91 |
| 1164766 | 9/1969 | United Kingdom . | |

*Primary Examiner*—Dean Kramer
*Attorney, Agent, or Firm*—Nutter, McClennen & Fish, LLP

[57] ABSTRACT

An apparatus for lifting one or more objects by suction includes a vacuum chamber, a grid element forming the floor of the vacuum chamber, and apparatus for creating a vacuum in the vacuum chamber. In an exemplary embodiment, the grid element includes a two-dimensional array of cells, each of which opens directly onto each opposite major surface of the grid element. Each cell has at least one valve member for closing and opening of the cell. The valve(s) normally assume a first position wherein the cell is open to provide direct communications through the cell between the opposite major surfaces of the grid element but are movable by a sufficient flow of air through the cell into a second position wherein the cell is substantially closed against such communication. Each valve member can include a flap valve pivoted for rotation between the first position and the second position, and a structure for supporting the grid element within the vacuum chamber.

6 Claims, 5 Drawing Sheets

GRID ELEMENT AND AN APPARATUS INCORPORATING THE GRID ELEMENT FOR ASSISTING IN THE STACKING AND DESTACKING OF PRODUCTS FROM A SURFACE

This invention relates to a grid element and an apparatus incorporating the grid element for assisting in the stacking and destacking of products from a surface or pallets and for full layer order picking operations.

A pallet is a portable platform for transporting and storing a load. Sometimes, a pallet may be loaded with a single object and on other occasions may be loaded with a plurality of objects generally of the same or different sizes. The present invention is directed to, but not limited to, the placement or removal of a plurality of objects on or from a pallet or many different pallets using an apparatus of the kind which employs suction means for raising the object(s).

A lifting apparatus employing suction means is known. The known apparatus employs a suction head which applies a vacuum over the whole top surface of the object or objects to be lifted via a vacuum chamber fitted with side-scaling curtains which prevent air leakage around the sides of the object. A centrifugal fan provides the vacuum. The vacuum is applied and released by automatically operated valves.

A problem arises when the apparatus lifts a plurality of objects on a layer or tier and one or more of them is absent or the patterns of the tier is such that a large number of small voids have been created. In such instance, the vacuum is partially or wholly destroyed by virtue of voids or absent objects(s) and hence, the apparatus will fail to function correctly.

A further problem arises wherein as the apparatus lowers the object or objects onto a pallet or onto an existing load, there is a danger that the weight of the load being lowered together with the weight of that part of the apparatus being lowered will crush or at least cause damage to an existing load present on the pallet.

One of the objects of the present invention is to overcome these problems associated with such an apparatus.

The invention, therefore, provides a grid element having a plurality of openings, each opening having a flap valve member associated therewith; wherein each valve member has a first position of use, wherein the opening is in the open condition, and a second position of use wherein the opening is in a closed condition.

Preferably, the grid element is a matrix of openings, each opening having a flap valve member associated therewith; each flap valve member being hingedly connected along an edge of an associated opening so that in the first position of use and by virtue of gravity the flap valve member is substantially perpendicular or transverse to the plane of the grid element and in the second position of use is in a plane substantially parallel to the grid element thereby closing the opening.

The invention also provides an apparatus for lifting one or more objects by means of suction which apparatus comprises a means for creating a vacuum at a vacuum head; means for actuating and deactuating the vacuum; a grid element according to the invention operatively associated with the vacuum head having a plurality of openings, each opening having a flap valve member associated therewith; wherein each valve member has a first position of use wherein the opening is in an open condition, and a second position of use wherein the opening is in a closed condition.

Preferably, the apparatus further comprises a gripping means operatively associated with the head having a first position of use and second position of use; wherein when in said first position of use, jaws of the gripping means are in the open condition and are not contactable with, or in positive gripping contact with, the object(s) attachable to the head and when in said second condition of use, the jaws of the gripping means are in a less open condition and contactable with the object(s) attachable to the head wherein means is provided for enabling said second condition of use to operate when the vacuum at the vacuum head is at a predetermined level.

The invention will be understood in greater detail from the following description of preferred embodiments thereof given by way of example only and with reference to the accompanying drawings in which.

Figure 1:
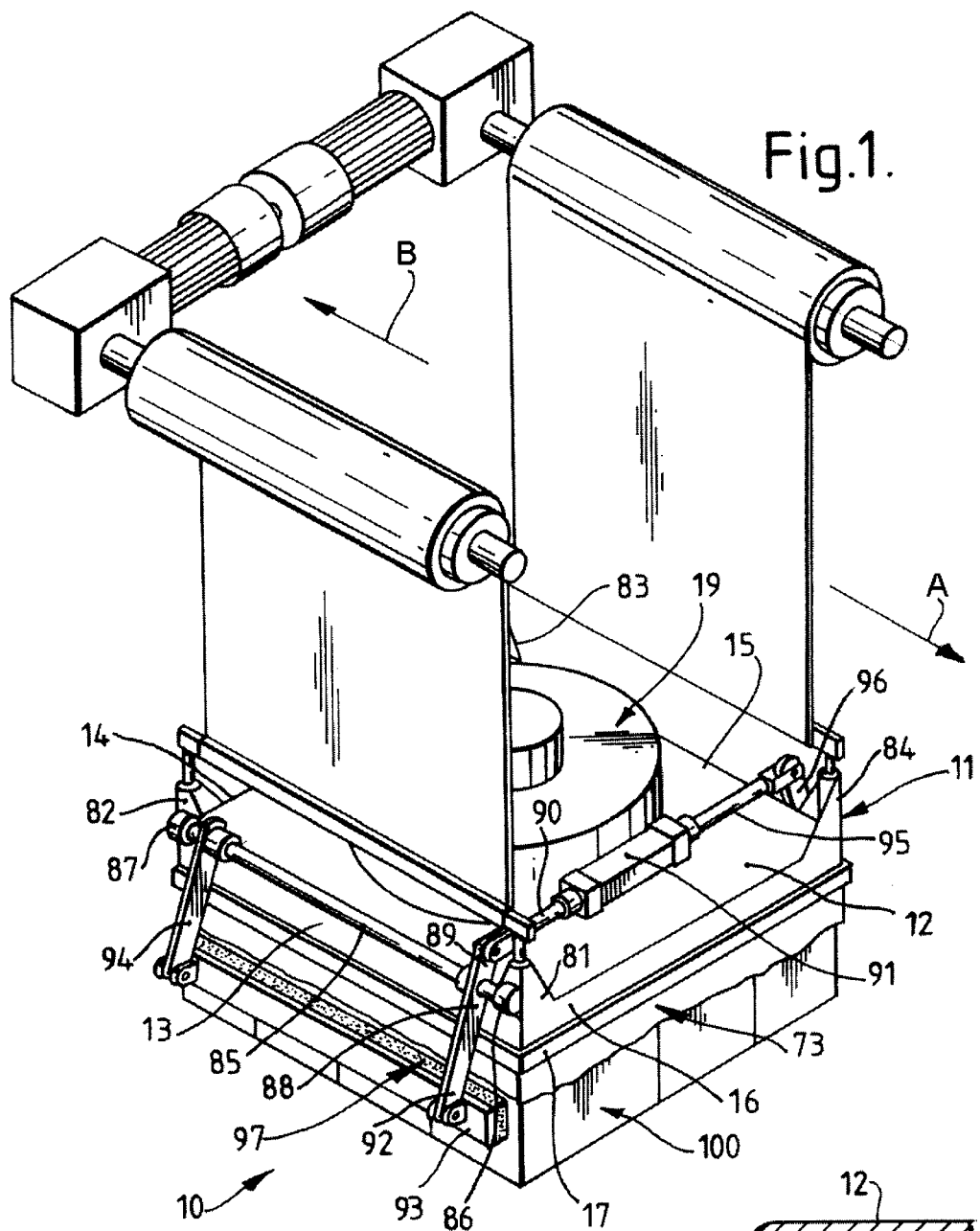
FIG. 1 is a perspective view of an apparatus according to the invention.
Figure 2:
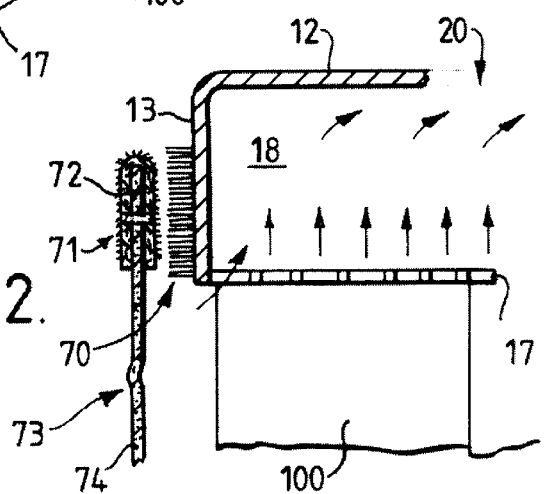
FIG. 2 is a detail of part of the apparatus of FIG. 1 of the drawings.

Referring now to the drawings and in particular to FIGS. 1–2 thereof, there is shown an apparatus 10 according to the invention which comprises a head 11 of box-shape construction having a top 12, side walls 13, 14, 15, 16 and a base all of which define a plenum chamber 18. Mounted on the top 12 is a centrifugal fan 19 operable at a relatively high RPM and capable of generating via a vacuum inlet valve (not shown) a reduced pressure area in the chamber 18 via an opening 20 in the top 12. The base comprises a grid 17 which defines a plurality of openings.

Figure 3:
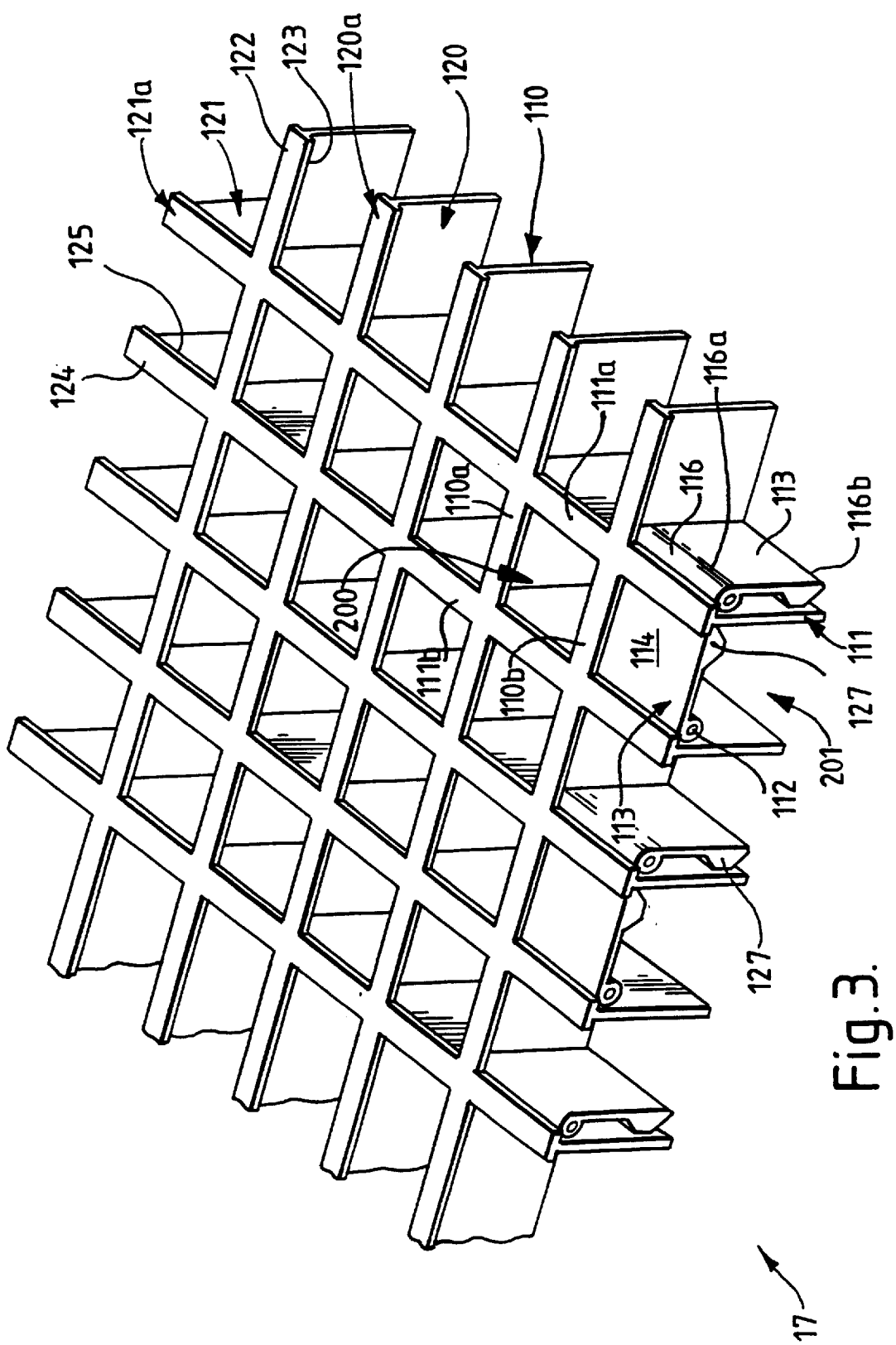
FIG. 3 is a perspective view of a first embodiment of a grid according to the invention for use in the apparatus of FIG. 1 of the drawings.
Figure 4:
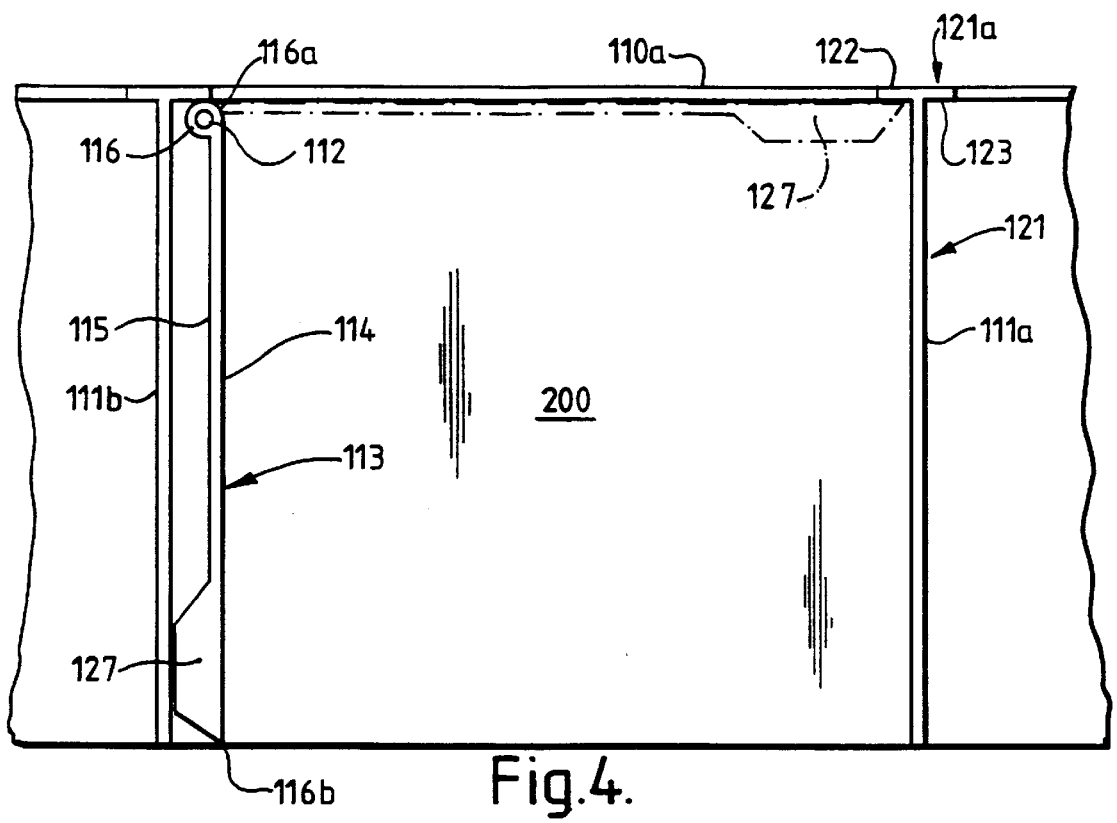
FIG. 4 is an elevation of part of the grid of FIG. 3 of the drawings.
Figure 5:
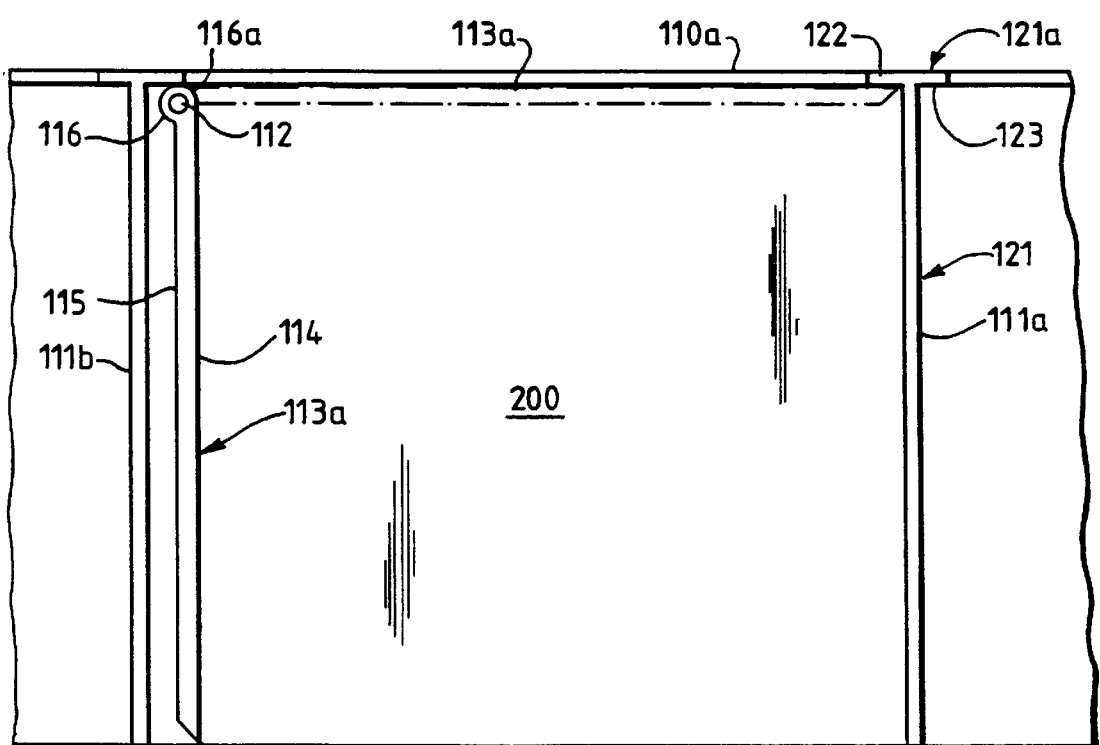
FIG. 5 is an elevation of part of a second embodiment of a grid according to the invention.

With particular reference to FIGS. 3–5, there is shown a construction of a grid 17 according to the invention primarily for use where, for example, there is a relatively large number of containers per unit area with an indeterminate number of unknown voids located anywhere about the unit area.

The grid 17 comprises laterally disposed members 110 and transversely disposed members 111 which form a plurality or matrix of voids or openings. The laterally disposed members 110 are T-shaped in cross-section as are the transversely disposed members 111. Thus, each of the members 110 comprise a leg 120 and an associated cross piece 120a; each of the members 111 comprise a leg 121 and an associated cross piece 121a. Each cross piece 120a has an upper face 122 and lower faces 123; each cross piece 121a has an upper face 124 and lower faces 125.

With particular reference to two adjacent single cell 200 and 201 of the grid 17, the laterally disposed members 110a, 110b and the transversely disposed members 111a and 111b form a substantially rectangularly shaped opening. Mounted in a suitable holes (not shown) between the transversely disposed members 111a, 111b is a pivot bar 112. The bar 112 is located in substantially parallel spaced apart relationship relative to the laterally disposed members 110a, 110b. In addition, the bar 112 is located adjacent to the member 110b.

In pivotal arrangement on the bar 112 is a flap valve member 113. The valve member 113 has a first or upper face 114 and a second or lower face 115. The valve member 113 is substantially rectangular in shape. The upper face 114 is substantially flat. The lower face 115 embraces a tubular portion 116, located adjacent one edge 116a, for engaging with the bar 112. A projection 127 is located adjacent an edge 116b opposite the edge 116a and projects from the lower race 115. The projection 127 may be of a suitable shape or weight configuration for reasons to be described later in the Specification.

With particular reference to FIG. 5 of the drawings, a flap valve member 113a is shown which is similar in construction to the flap valve member 113 except that both faces 114, 115 are substantially flat and without the projection 127.

Figure 6:
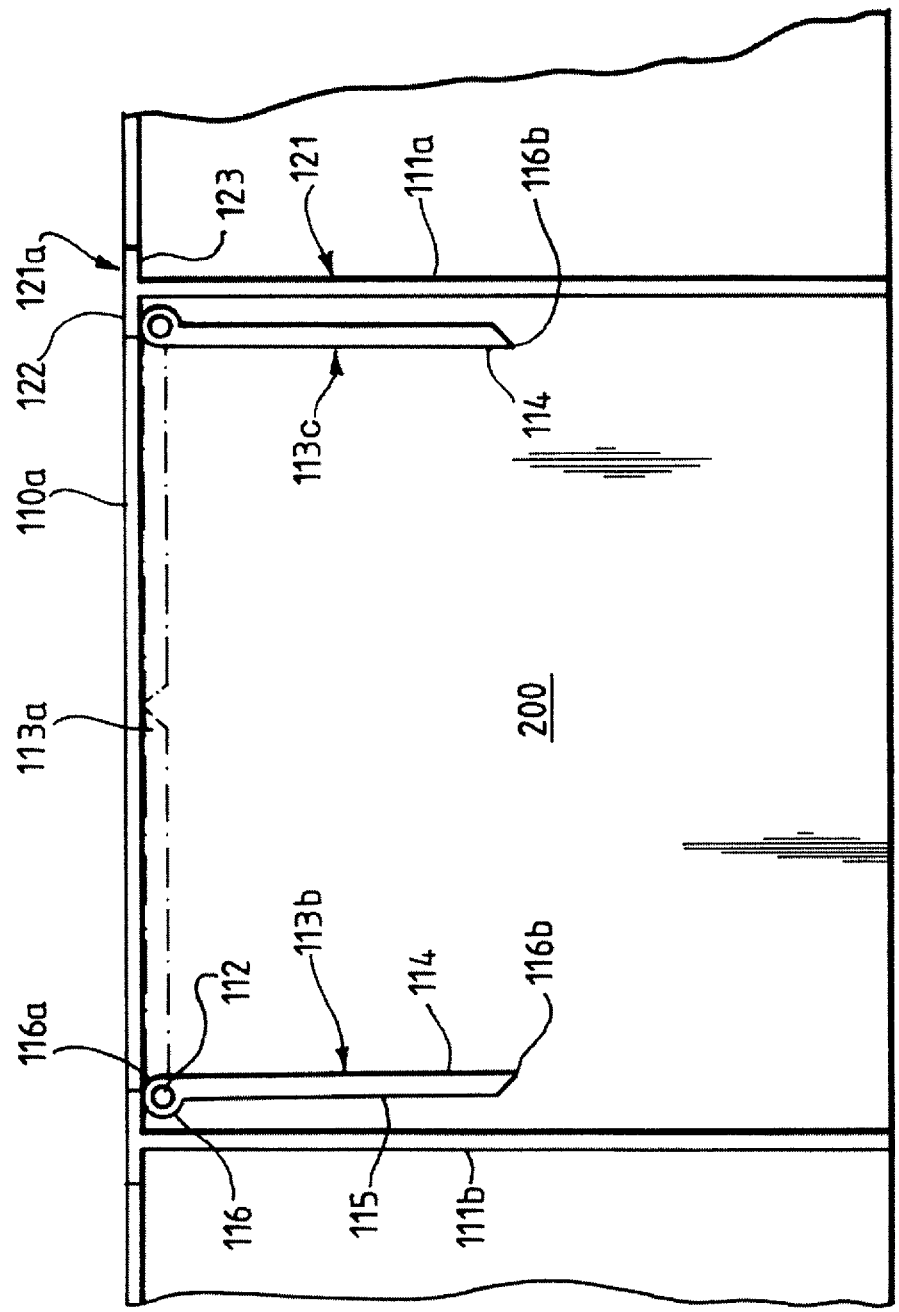
FIG. 6 is an elevation of part of a third embodiment of a grid according to the invention.

With particular reference to FIG. 6 of the drawings, there is shown a pair of flap valve members 113b and 113c. Each of the flap valve members 113b and 113c is similar in construction to the flap valve member 113a, is mounted in a similar fashion, and operates in a similar fashion to the flap valve member 113a. However, because, there are two valve members 113b and 113c, which operate in the manner of a trap door, it is possible for one of the flaps to be in the open condition of use while with the other in the closed condition of use. Of course, it is also possible for both flap valve members 113b and 113c to be simultaneously in the open condition of use or simultaneously in the closed condition or use.

The flap valve member 113 by virtue of the location of the tubular portion 116 vis-a-vis the bar 112 is biased into the lower or open condition (see FIG. 4). When in the closed condition as shown in dotted outline in FIG. 4, the valve member 113 abuts the lower faces 123, 125 thereby closing the opening of that cell 200 associated therewith.

Referring to FIGS. 1 and 2 of the drawings, and in order to ensure that the vacuum is optimally employed, a side seal curtain or skirt 73 is provided. A quick release fitting is provided one part 70 of which is applied by means of a suitable adhesive to the side walls 13–16 and the other part 71 of the quick release fitting is applied to one end 72 of the curtain or skirt 73. The skirt 73 is quickly and easily applied to the side walls 13–16 so that the other end 74 thereof projects downwardly thereby providing a suitable seal. When it is desired to change the skirt 73, the end 74 is gripped so as to pull the end 73 away from the part 70. A replacement skirt 73 can be quickly and easily positioned on the side walls 13–16.

Referring now to FIG. 1 of the drawings, the top 12 further comprises four upstanding arms 81–84 each of which is located at a corner of the top 12. Connecting the arms 81, 82 is a shaft 85 being adapted for rotational movement between a pair of guide elements 86, 87 attached to the arms 81, 82 respectively.

Attached to one end of the shaft 85 is a gripper arm 88 one end 89 of which is pivotally connected to a first piston 90 of a linear actuator 91 the other end 92 of which gripper arm 88 is pivotally attached to one end of the first side gripper element 93. The other end of the shaft 85 has a gripper arm 94 attached thereto the tree end of which is pivotally attached to the other end of the gripper element 93. The actuator 91 has a second piston 95 the free end of which is pivotally connected to one end of a gripper arm 96. The other end of the gripper arm 96 is attached to a shaft (not shown) of similar construction to the shaft 85, said shaft also having a gripper arm (not shown) similar to the gripper arm 94 and providing a second side gripper element similar to the side gripper element 93. The gripper element 93 and its opposite counterpart each has suitable rubber padding 97 on opposing faces thereof.

Hoisting and lowering of the head 11 is achieved by the remainder of the apparatus shown in FIG. 1 which remainder is of known construction and need not be described in detail here.

In use, the apparatus 10 operates as follows. It is desired to transfer the load 100 comprising a plurality of cartons from one location to, for example, a pallet 300. The head 11 is lowered. The grid 17 is attached to the base.

All the flap valve members 113 (or 113a) are in the first or open condition as shown in solid outline in FIG. 4 (or FIG. 5) of the drawings and, with the vacuum inlet valve closed, no suction emanates from below the grid 17. As the head 11 is lowered, the skirt 73 embraces the load 100 and the vacuum inlet valve is opened. When a container is present, the associated opening is closed by the presence of the container and the flap valve member 113 (or 113a) remains in the open condition. For an opening which is not occluded by a container or is not, for example, more than between 75%–80% occluded, the air flow is counterbalanced by the weight of the flap valve member 113 (or 113a). In the case of the flap valve member 113, it is the projection 127 which primarily determines the weight which biases the member 113 into the open condition.

Accordingly, having regard to the weight of the flap valve member 113 (or 113a) and the volume of air passing through the opening, there is now a tendency for the flap valve member 113 (or 3a) to begin to pivot in the direction of the closed condition of the valve member 113 (or 13a). As the member 113 (or 113a) pivots further in the direction of the closed condition, the lower face 115 becomes increasingly exposed to the flow or air through the opening to the extend that the valve member 113 (or 113a) rapidly assumes the closed condition thereby closing that opening and helping to maintain the overall vacuum seal in the plenum chamber 10. If on the other hand, a container covers for example, less than 75%–80% of the opening, the volume of air would not be strong enough to lift up the flap valve member 113 (or 113a) which would remain in the open condition. In that even, the opening would be effectively sealed by the container. It will be appreciated, therefore, that, if on balance, there is a certain amount of an opening being blocked by a portion of a container, suction may be allowed to continue to act as the flap valve member 113 (or 113a) would not close and yet the power of the centrifugal fan would be sufficient to compensate for the resultant overall vacuum loss.

The grid 17 may, if desired, be floating, i.e. it is capable of adjusting itself depending on the horizontal surface of the containers it is picking up.

Figure 7:
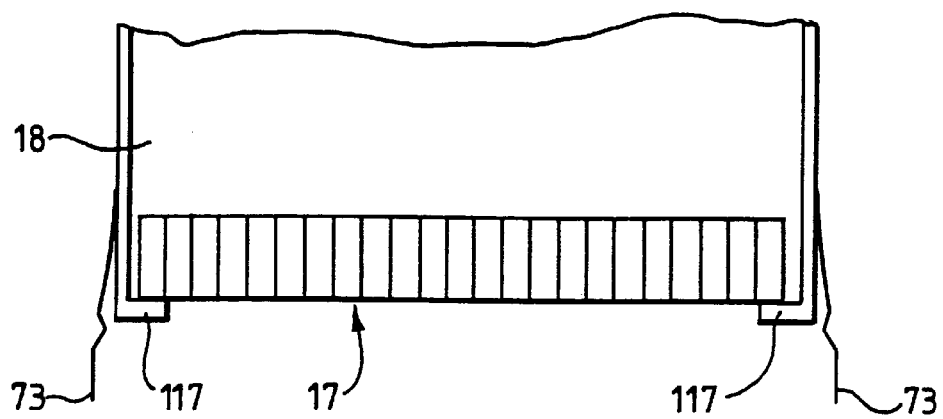
FIG. 7 is a cross-sectional view of a floating grid according to the invention.
Figures 8, 9:
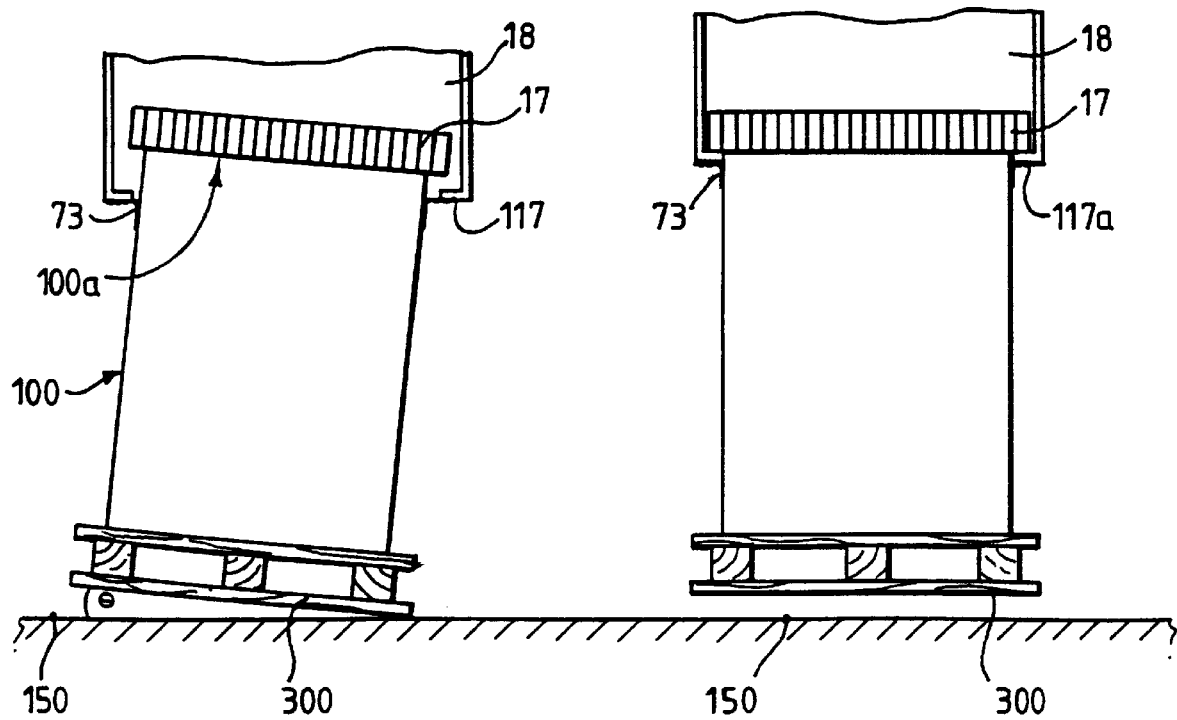
FIGS. 8 and 9 are cross-sectional views of the grid of FIG. 7 shown in use.

Thus with particular reference to FIGS. 7–9, there is shown the grid 17 housed in the plenum chamber 18 as previously described. However, instead of the base comprising the grid 17, the base comprises inward projections 117 upon which passively rests the grid 17. Therefore the grid 17 is free to move upwardly or downwardly, or float within the plenum chamber 18.

Thus, if in the event that the lead 100 to be lifted does not have a horizontally disposed surface 100a (FIGS. 8–9) but instead has a sloping surface (because, for example, the pallet 300 on which the load 100 rests is sloping at an angle $\theta$ relative to the ground 150), as the head 11 is lowered and ensuring that the load 100 can be contained within the gap between the inward projections 117, the uppermost part of the load 100 first engages with the grid 17 thereby pushing the grid 17 off the inward projections 117 and further into the plenum chamber 18. When the head 11 is raised, the projections 117a eventually engage with the grid 17 to enable the load 100 to be lifted in a new horizontally disposed condition relative to the ground 150 (FIG. 9).

In addition, each corner of the grid 17 may be provided with a respective proximity detector all of which must detect an object before a "lift" can occur. Thus the only weight being applied to the surface of the containers 100 is the weight of the grid 17 which is, preferably, made from a relatively light material such as aluminium.

The head 11 is raised having the load 100 attached by suction and the entire apparatus 10, being mounted on a suitable traversing means (now shown) moves in the direction of the arrow A or B as desired to the required location. At the required location, the head 11 is lowered so as to place the load 100 on the pallet or on an existing load on the pallet, the vacuum inlet valve is closed thereby releasing the load 100 from the head 11, the head 11 is raised and the apparatus 10 traverses in the direction of the next load. All the flap valve members 113 or (113a) automatically return to the first or open condition.

A load 100 of up to about 300 kg may be lifted at any one time.

Sometimes, the apparatus 10 is used in locations which are subject to electrical power cuts resulting in a loss of vacuum due to stoppage of the fan 19. Under normal conditions, the linear actuator 91 is powered by the electrical power supply so as to maintain the gripper elements 93 in the open or non-contacting condition. Should there be an interruption in the power supply, or when the vacuum measured in the chamber 18 falls to a predetermined value, the actuator 91 is automatically actuated so as to cause the pistons 90, 95 to be pushed outwardly thereby causing the gripper elements 93 to close on the load 100. The time taken for the gripper elements 93 to close on the load 100 is considerably shorter than the period of time which the vacuum ceases to exist as a result of stoppage of the fan 19 and hence, the load 100 is prevented from falling to the ground.

Upon restoration of the electrical supply, the fan 19 is again placed automatically in the operative condition and the linear actuator is manually reset thereby opening the gripper elements 93. The padding 97 serves to prevent damage to the load 100 when the gripper elements 93 are in contact with the load 100.

When the apparatus 10 reaches the location it is desired to release the load 100, as soon as the load 100 touches the surface on which it is to be placed, there is an immediate reduction in the mass or weight acting on the load cell apparatus. This reduction in mass can be as low as a few grams. It will be appreciated that the surface onto which the load 100 is placed can be a conveyor, a floor or a pallet or a previously loaded load or loads mounted on the pallet. To ensure that the head 11 and its associated load 100 does not crash down on top of the pallet per se or on top of the existing load on the pallet, a suitable detecting mechanism can be used to detect the distance between the load 100 on the head 11 and the top surface of the pallet or on existing load on the pallet.

Accordingly, it is possible for the lowering to take place at a relatively high speed just prior to contact of the load 100 with the top surface of the pallet or an existing load in which case, the speed of descent of the head 11 is reduced to a relatively slow rate.

The invention is not limited by or to the specific embodiments described which can undergo considerable variation without departing from the scope of the invention.

I claim:

1. An apparatus for lifting one or more objects by means of suction, which apparatus comprises a vacuum chamber, a grid element forming the floor of the vacuum chamber, and means for creating a vacuum in the vacuum chamber, the grid element comprising a two-dimensional array of cells each of which opens directly onto each opposite major surface of the grid element, each cell having at least one valve member for closing and opening of the cell, the valve member(s) normally assuming a first position wherein the cell is open to provide direct communication through the cell between the opposite major surfaces of the grid element but being movable by a sufficient flow of air through the cell into a second position wherein the cell is substantially closed against such communication, wherein each valve member comprises a flap valve pivoted for rotation between the first position and the second position, and means for supporting the grid element within the vacuum chamber, wherein the grid element is capable of upward and downward movement in the vacuum chamber away from and towards the base of the vacuum chamber.

2. An apparatus as claimed in claim 1 wherein the supporting means comprises a projection at the base of the vacuum chamber so that the grid element is capable of upward and downward movement away from and towards the projection.

3. An apparatus for lifting one or more objects by means of suction, which apparatus comprises a vacuum chamber, a grid element forming the floor of the vacuum chamber, and means for creating a vacuum in the vacuum chamber, the grid element comprising a two-dimensional array of cells each of which opens directly onto each opposite major surface of the grid element, each cell having at least one valve member for closing and opening of the cell, the valve member(s) normally assuming a first position wherein the cell is open to provide direct communication through the cell between the opposite major surfaces of the grid element but being movable by a sufficient flow of air through the cell into a second position wherein the cell is substantially closed against such communication, wherein each valve member comprises a flap valve pivoted for rotation between the first position and the second position, and means for supporting the grid element within the vacuum chamber, wherein each flap valve is biased into the first position solely by its weight.

4. An apparatus as claimed in claim 3 wherein each flap valve has a projection located adjacent an edge remote from the axis of rotation which projection provides additional weight to the valve to bias the valve into the first position.

5. An apparatus for lifting one or more objects by means of suction, which apparatus comprises a vacuum chamber, a grid element forming the floor of the vacuum chamber, and means for creating a vacuum in the vacuum chamber, the grid element comprising a two-dimensional array of cells each of which opens directly onto each opposite major surface of the grid element, each cell having at least one valve member for closing and opening of the cell, the valve member(s) normally assuming a first position wherein the cell is open to provide direct communication through the cell between the opposite major surfaces of the grid element but being movable by a sufficient flow of air through the cell into a second position wherein the cell is substantially closed against such communication, wherein each valve member comprises a flap valve pivoted for rotation between the first position and the second position, and means for supporting the grid element within the vacuum chamber, wherein each cell has a pair of flap valves so that, in use, both flap valves may be simultaneously in the first position or simultaneously in the second position or one of the valves may be in the first position while the other one may be in the second position.

6. An apparatus for lifting one or more objects by means of suction, which apparatus comprises a vacuum chamber, a grid element forming the floor of the vacuum chamber, and means for creating a vacuum in the vacuum chamber, the grid element comprising a two-dimensional array of cells each of which opens directly onto each opposite major surface of the grid element, each cell having at least one valve member for closing and opening of the cell, the valve member(s) normally assuming a first position wherein the cell is open to provide direct communication through the cell between the opposite major surfaces of the grid element but being movable by a sufficient flow of air through the cell into a second position wherein the cell is substantially closed against such communication, wherein each valve member comprises a flap valve pivoted for rotation between the first position and the second position, and means for supporting the grid element within the vacuum chamber, the apparatus further comprising a pair of opposing gripper elements operatively associated with the vacuum chamber and movable between a first position in which the gripper elements are not in positive gripping contact with a load attached to the vacuum chamber and a second position in which the gripper elements grip a load attached to the vacuum chamber, and wherein means are provided for automatically moving the gripper elements to the second position when the vacuum at the vacuum chamber falls to a predetermined level.

* * * * *